UNITED STATES PATENT OFFICE.

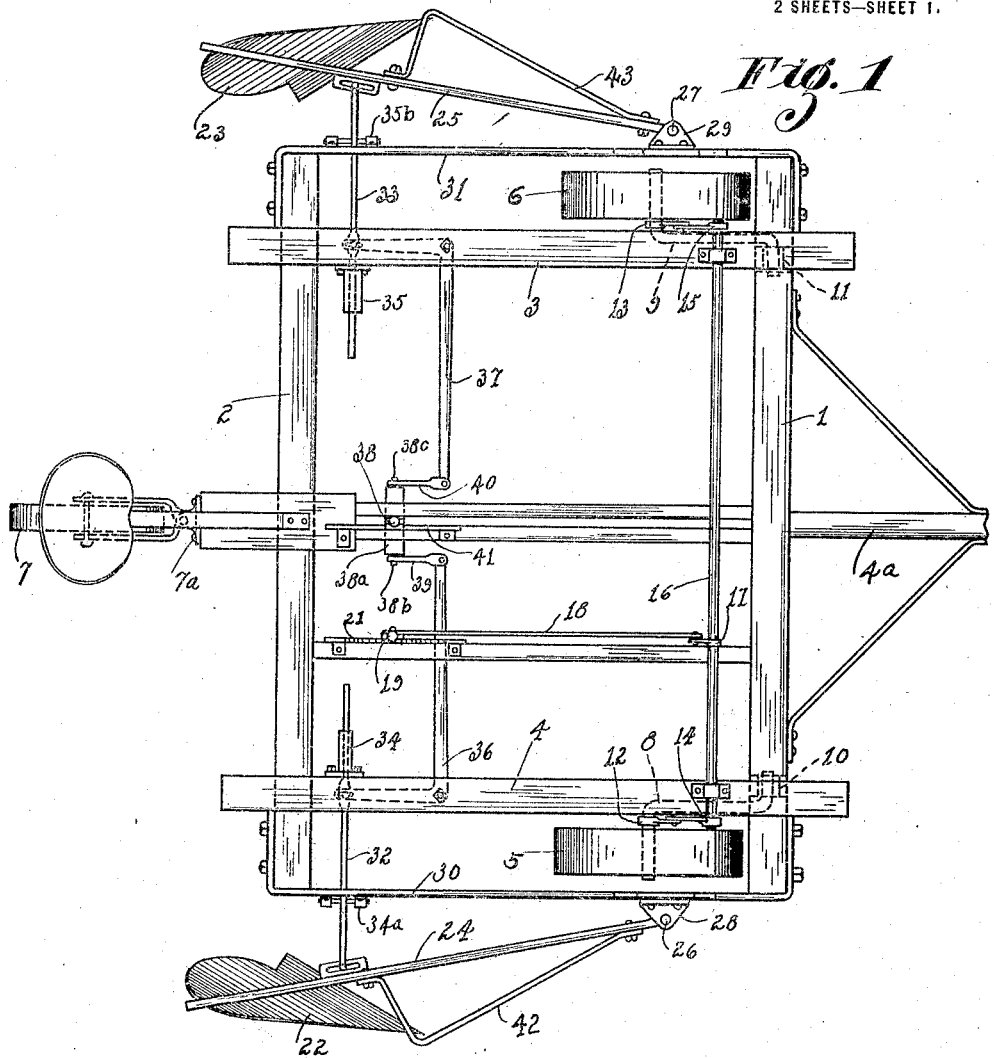

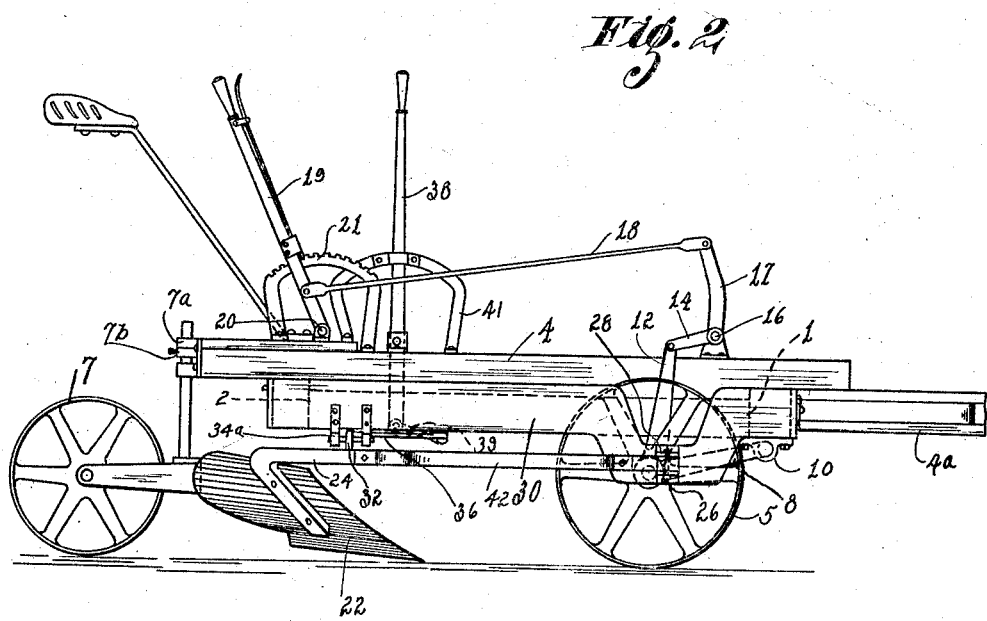

CHARLES GEIRMANN, OF LODI, CALIFORNIA.

VINEYARD-PLOW.

1,276,051.  Specification of Letters Patent.  Patented Aug. 20, 1918.

Application filed April 10, 1916, Serial No. 90,148. Renewed June 29, 1918. Serial No. 242,671.

*To all whom it may concern:*

Be it known that I, CHARLES GEIRMANN, a citizen of the United States, residing at Lodi, in the county of San Joaquin, State of California, have invented certain new and useful Improvements in Vineyard-Plows; and I do declare the following to be a full, clear, and exact description of the same, reference being had to the accompanying drawings, and to the characters of reference marked thereon, which form a part of this application.

This invention relates to improvements in plows and particularly to that class of plows used in vineyard or orchard cultivation, the structure being such that the plow will be permitted to move under the overhanging vines and branches and to come as close as is desired to the roots of the vines or trees and remove the ground therefrom. The plow cannot engage the trunk of the vines or trees, as I have provided an arrangement to eliminate this fault so often found in the many types of plows now commonly used for vineyard and orchard plowing. To return the dirt around the roots of the vines or trees it will only be necessary to reverse the plows upon the standards thereby throwing the dirt back to its original position. The control of the plows is simple and easily worked by the operator as is also the raising and lowering means which is provided for gaging the depth at which it is desired to plow.

A further object of the invention is to provide a simple and inexpensive device and yet one which will be exceedingly effective for the purposes for which it is designed.

These objects I accomplish by means of such structure and relative arrangement of the parts as will fully appear by a perusal of the following specification and claims.

In the drawings similar characters of reference indicate the corresponding parts in the several views.

Figure 1 is a top plan view of the plow.

Fig. 2 is a side elevation of the same.

Referring now more particularly to the characters of reference on the drawings the numeral 1 indicates a front transverse member of the frame, and the numeral 2 a rear transverse member of the frame. Placed above these members and running longitudinal are beams 3 and 4 respectively serving to tie the rectangular frame thus formed in a strong and secure manner.

Fastened to the front member 1 of the frame, I have provided a tongue $4^a$ which may be used as a means for drawing the plow ahead either by horses or tractor power.

To gage the depth of the furrow, I have provided a raising and lowering means consisting of three wheels 5, 6 and 7. The wheels 5 and 6 are each mounted upon cranks 8 and 9 and each separately fastened to the frame by means of bearings, as at 10 and 11. To move the cranks 8 and 9 up and down I have fastened thereto links, as at 12 and 13, which connect to levers 14 and 15 mounted upon each end of a common rock shaft 16 fastened to which is an upright lever arm 17 communicating by means of a link rod 18 to a lever 19 pivoted, as at 20, the position of which may be set and maintained by means of a toothed quadrant 21. By pushing the lever ahead the plows will be raised out of the ground, and vice versa, to lower the plows into the ground.

The wheel 7 is mounted in an ordinary swivel bracket $7^a$ and will automatically adjust itself or may be fastened in position by means of a set collar $7^b$.

The plows, two of which are provided one on either side of the frame and toward the rear thereof, as at 22 and 23, are fastened to beams 24 and 25 extending to a point near the front of the frame and pivotally connected thereto by means of pins 26 and 27 working between lugs 28 and 29 fastened to members 30 and 31 secured upon each side of the frame.

To move these plows 22 and 23 in or out from the sides of the frame, I have provided a lever system consisting of links 32 and 33 hinged to the beams 24 and 25. These links 32 and 33 project inwardly, and, supported by guides 34 and 35, and also roller guides $34^a$ and $35^b$, are pivotally connected to bell cranks 36 and 37 which are in turn connected to an operating lever 38 by means of short links 39 and 40.

The lower end of the lever 38 is provided with a cross member $38^a$ having round lugs $38^b$ and $38^c$ projecting therefrom for connection with the links 39 and 40. A quadrant 41 immediately adjacent the lever 38 acts only as a guide therefor and does not keep the lever in any certain fixed position. This free movement is allowed so that the plows 22 and 23 will not engage the roots of the vines or trees and is obtained by means of outstanding guides as at 42 and 43, fastened upon the standards 24 and 25. These guides will strike the trunk of the vines if the plows approach too close and deflect the plows therefrom; the normal position will then be regained by operating the lever 38.

From the foregoing description it will readily be seen that I have produced such a device as will substantially fulfil the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A vineyard plow comprising a frame, beams hinged to the side of the frame and arranged for horizontal movement with respect thereto, plowing devices carried by the beams, guides on the frame, links pivotally connected with the beams and being freely movable through the guides and a freely swinging lever fulcrumed on the frame and connected with the links.

2. A vineyard plow comprising a frame, beams hinged to the side of the frame and movable horizontally with respect thereto, plowing devices carried by the beams, links pivotally connected with the beams, guides on the frame, said links being freely movable through said guides, an operating lever connected with the links, said beams being adapted to move inwardly when encountering trees or vines, the links and lever being movable with the movement of said beams, and said lever being operable to throw the beams outward again.

3. A vineyard plow comprising a frame, a pair of beams hinged on the frame and arranged for horizontal swinging movement with respect thereto, plowing devices carried by the beams, fixed guides on the frame, links hinged to the beams and having free movement through the guides in either direction to allow the beams to swing at will, a freely swinging lever fulcrumed on the frame, a cross head on the lower end of the lever, a pair of bell cranks fulcrumed on the frame, a link connecting the cross head with one end of each bell crank, the opposite ends of the bell cranks being slotted, and pins on the first named links projecting into the slots.

In testimony whereof I affix my signature.

CHARLES GEIRMANN.

Copies of this patent may be obtained for five cents each, by addressing the "Commissioner of Patents, Washington, D. C."